(12) United States Patent
Piirainen

(10) Patent No.: US 6,421,402 B1
(45) Date of Patent: Jul. 16, 2002

(54) METHOD FOR CALCULATING IMPULSE RESPONSE, AND RECEIVER

(75) Inventor: Olli Piirainen, Oulu (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/101,754
(22) PCT Filed: Nov. 20, 1997
(86) PCT No.: PCT/FI97/00710
  § 371 (c)(1),
  (2), (4) Date: Jul. 16, 1998
(87) PCT Pub. No.: WO98/25351
  PCT Pub. Date: Jun. 11, 1998

(30) Foreign Application Priority Data

Nov. 21, 1996 (FI) .................................................. 964645

(51) Int. Cl.⁷ ............................................. H04B 17/00
(52) U.S. Cl. ...................................................... 375/346
(58) Field of Search ................................ 327/307, 309, 327/311; 375/340, 346

(56) References Cited

U.S. PATENT DOCUMENTS

| | | | |
|---|---|---|---|
| 4,878,232 A | * 10/1989 | Fisher | 375/362 |
| 4,912,758 A | * 3/1990 | Arbel | 379/388 |
| 5,199,047 A | 3/1993 | Koch | |
| 5,245,611 A | * 9/1993 | Ling et al. | 370/347 |
| 5,442,655 A | * 8/1995 | Dedic et al. | 375/340 |
| 5,606,466 A | * 2/1997 | Fisher et al. | 360/51 |
| 5,805,478 A | * 9/1998 | Kim | 708/232 |
| 5,818,544 A | * 10/1998 | Han | 348/725 |
| 6,144,709 A | * 11/2000 | Piirainen et al. | 375/343 |
| 6,192,238 B1 | * 2/2001 | Piirainen | 455/422 |

FOREIGN PATENT DOCUMENTS

GB 2 247 812 3/1992

OTHER PUBLICATIONS

A copy of the International Search Report for PCT/FI97/00710.

* cited by examiner

Primary Examiner—Chi Pham
Assistant Examiner—Kevin M Burd
(74) Attorney, Agent, or Firm—Altera Law Group, LLC

(57) ABSTRACT

The invention relates to a method for estimating an impulse response, and a receiver whose received signal is formed of bursts comprising a training sequence and the receiver comprising analog-to-digital converter for sampling the received signal and signal processor for measuring a DC offset in the samples. To simplify the receiver structure, the receiver comprises a calculating device for calculating the impulse response by correlating the samples taken with the training sequence before removing the DC offset, and the signal processor for removing the DC offset effect from the calculated impulse response.

5 Claims, 2 Drawing Sheets

METHOD FOR CALCULATING IMPULSE RESPONSE, AND RECEIVER

FIELD OF THE INVENTION

The invention relates to a method for estimating an impulse response in a digital radio system, in which the signals to be transmitted comprise bursts formed of symbols, the bursts comprising a known training sequence, the method comprising sampling from a received signal, measuring of a DC offset in the samples and correlating the signal with the known training sequence.

BACKGROUND OF THE INVENTION

In a typical cellular radio environment the signals between a base station and a subscriber terminal propagate on several routes between a transmitter and a receiver. This multipath propagation is mainly caused by signal reflections from surrounding surfaces. Signals travelling on different routes arrive at the receiver at different times because of a different propagation delay. This holds true for both transmission directions. The multipath propagation of a signal can be monitored in a receiver by measuring the impulse response of the received signal, signals arriving at different times being visible as peaks proportional to their signal strength. FIG. 1 illustrates a measured impulse response by way of example. Time is on horizontal axis 100 and the strength of the received signal is on vertical axis 102. Peaks 104, 106, 108 of the curve indicate the strongest multipath propagated components of the received signal.

In prior art solutions the impulse response is estimated using a known training sequence added to the burst. In known solutions, e.g. in the GSM system, the impulse response is estimated by cross-correlating the received samples with a known training sequence. FIG. 2 illustrates one example of a prior art solution. Received signal 200, converted into an intermediate frequency or to a baseband, is transmitted to sampling means 202 in which samples taken 204 are transmitted to memory means 206 from which digital signal processor 210 reads samples 208 and processes them. Samples 204 comprise a DC offset which is removed before demodulation and impulse response calculation. This causes delay in signal processing. In the signal processor the DC offset is removed, then the signal is demodulated and the impulse response can be calculated by correlating signal with the training sequence. The correlation comprises adding and subtracting operations, and the digital signal processor unefficiently performs said operations compared with the solutions built out of special components. Access burst calculation in particular is a substantial load for the signal processor.

SUMMARY OF THE INVENTION

An object of the present invention is to implement a method and a receiver in which a signal processor load can be reduced and with which an impulse response can be rapidly and efficiently calculated.

This is achieved with the method set forth in the preamble characterized in that the method comprises impulse response calculation by correlating the samples taken with a training sequence before the DC offset is removed and the removal of the DC offset effect from the calculated impulse response.

The invention also relates to a receiver in a digital radio system where a received signal comprises bursts formed of symbols, the bursts comprising a known training sequence, the receiver comprising means for sampling the received signal, and means for measuring a DC offset in the samples. The receiver of the invention is characterized in that the receiver comprises means for calculating an impulse response by correlating the samples taken with the training sequence before the DC offset is removed, and means for removing the DC offset effect from the calculated impulse response.

The solution of the invention has several advantages. The solution of the invention is easy to implement. For example in the GSM system the impulse response calculation of an access burst is the heaviest calculation operation of a frequency equalizer in a GSM base station. With the solution of the invention the calculation can be implemented twice as easy in comparison with current solutions. Furthermore, the solution of the invention allows impulse response calculation in connection with sampling, thus speeding up the calculation. This was not previously possible due to the error caused by the DC offset.

BRIEF DESCRIPTION OF THE DRAWINGS

In the following, the invention will be described in greater detail with reference to examples in the accompanying drawings, in which.

DETAILED DESCRIPTION OF THE PREFERRED EMBODIMENTS

The invention can be applied to any digital radio system where a burst comprises a training sequence. One example of such systems is the GSM cellular radio system, and in the following, it is used as an example when describing the invention although not restricting thereto.

Figure 1:
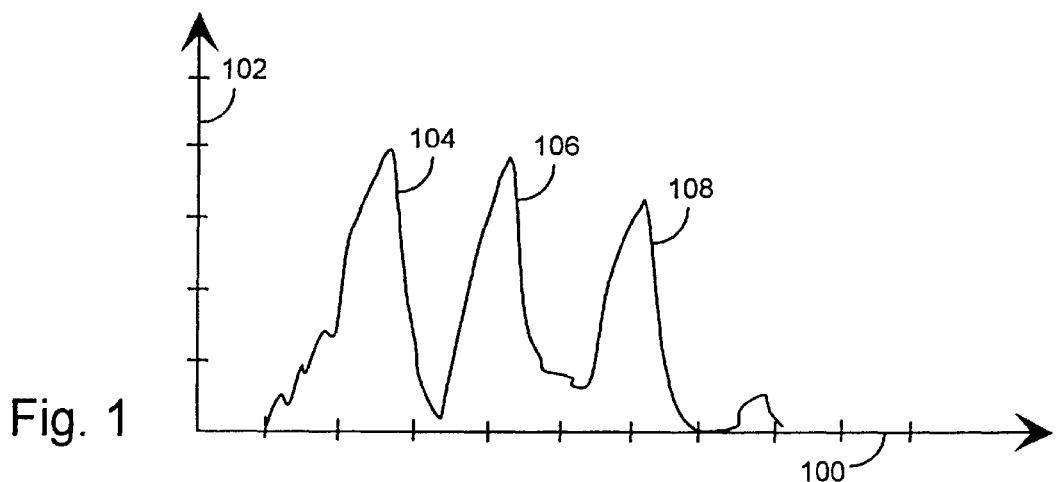
FIG. 1 shows an example described above of the impulse response of a received signal.
Figure 2:
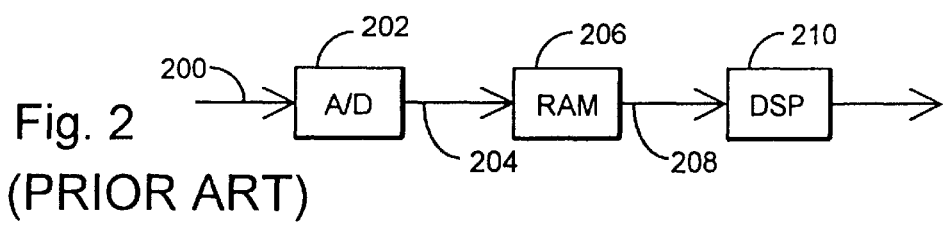
FIG. 2 illustrates a prior art solution for impulse response calculation.
Figure 3:
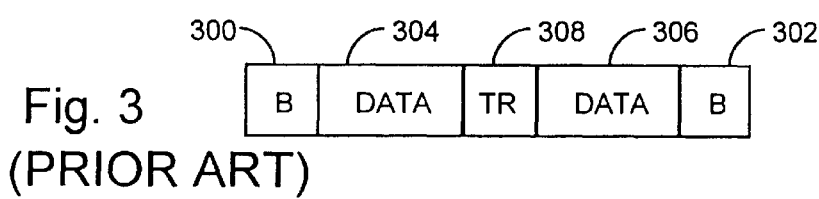
FIG. 3 shows a normal burst of the GSM system.

In prior art solutions the impulse response is estimated by a known training sequence added to the burst. FIG. 3 shows by way of example a normal burst of the GSM system, comprising start and end bits 300, 302, actual data in two parts 304, 306, and known training sequence 308 placed in the middle of the burst. In a normal burst the length of the training sequence is 26 bits.

The receivers of a digital system typically sample the received signal i.e. convert it into digital form by sampling it at given intervals. The samples comprise a DC offset, which in practice denotes the mean calculated of all received samples. The received signal can be shown in vector form $$R_{re} = R_{re\_id} + DC_{re}$$

$$R_{im} = R_{im\_id} + DC_{im}$$

where subscript re denotes a real part and subscript im an imaginary part. $DC_{re}$ and $DC_{im}$ are the DC offsets and $$R_{re\_id} = (R_{re\_id}(0) R_{re\_id}(1) \ldots R_{re\_id}(M-1))$$

$$R_{im\_id} = (R_{im\_id}(0) R_{im\_id}(1) \ldots R_{im\_id}(M-1))$$

denote the received ideal signal where M is the length of the burst.

In the solution of the invention the impulse response is measured and demodulated simultaneously in parallel. At this point, the impulse response is still distorted by the DC offset of the samples. In the solution of the invention the DC offset effect is removed from the calculated impulse response using a simple correction term.

Let us examine the demodulation in the GSM system. Demodulation can be performed by multiplying the received samples $$S(i)=(R_{re}(i)+j\,R_{im}(i)\,)e^{-j0.5\pi i}$$

where $i=0,\ldots,M-1$.

The exponent term $e^{-j0.5\pi i}$ defines sequence $1, -j, -1, j$, which is continuously repeated. Also the term $e^{-j0.5\pi I}$ can be used, then only the signs are inverted. S can thus be indicated as $$S_{re}=(R_{re}(0)R_{im}(1)-R_{re}(2)-R_{im}(3)R_{re}(4)\ldots)^T$$

and $$S_{im}=(R_{im}(0)-R_{re}(1)-R_{im}(2)-R_{re}(3)R_{im}(4)\ldots)^T.$$

Owing to the DC offset the demodulated samples can be written as $$S_{re\_id}=S_{re}-(DC_{re}DC_{im}-DC_{re}-DC_{im}\ldots)^T$$

$$S_{re\_id}=S_{re}-DCre$$

and $$S_{im\_id}=S_{im}-(DC_{im}-DC_{re}-DC_{im}DC_{re}\ldots)^T.$$

$$S_{im\_id}=S_{im}-DC_{im}$$

where $S_{re\_id}$ and $S_{im\_id}$ are the terms from which the DC offset has been removed.

For calculating impulse response the training sequence is first defined as a vector $$trs=(trs(0)trs(1)\ldots trs(N)),$$

where N is the length of the training sequence. A matrix is formed using the training sequence vector $$T = \begin{pmatrix} trs & 0 & 0 & 0 \\ 0 & trs & 0 & 0 \\ & & \ldots & \\ 0 & 0 & 0 & trs \end{pmatrix}$$

There are as many T lines in the matrix as there are cross correlation taps to be calculated. The impulse response H can thus be calculated using the cross correlation as follows:

$$H_{re}=T^*S_{re\_id}=T^*(S_{re}-DC_{re})=T^*S_{re}-T^*DC_{re}$$

$$H_{im}=T^*S_{im\_id}=T^*(S_{im}-DC_{im})=T^*S_{im}-T^*DC_{im}.$$

The above formulas show that the impulse response taps can be calculated before the DC offset is removed from the signal. The distortion can be removed from the acquired impulse response still being distorted by the DC offset by subtracting the terms $T^*DC_{re}$ and $T^*DC_{im}$ from the calculated values.

It should be noted that if the training sequence is not at the beginning of the burst then a corresponding offset should be used in indexing. For the sake of simplicity it is assumed here that the training sequence is at the beginning of the burst, although this is not the case e.g. in the GSM system.

The terms $DC_{re}$ and $DC_{im}$ comprise only four possible values: $\pm DC_{re}$ and $\pm DC_{im}$ which are repeated in a sequence determined by demodulation and which values can be measured. The DC offset effect can thus be removed by reducing a correction term from the calculated impulse response, the correction term being calculated by multiplying the measured DC offset values using the training sequence by precalculated multipliers. The correction terms can be calculated using the following formulas:

$$T^*DC_{re} = \begin{pmatrix} A(0)DC_{re}+B(0)DC_{im} \\ A(1)DC_{re}+B(1)DC_{im} \\ A(2)DC_{re}+B(2)DC_{im} \\ A(3)DC_{re}+B(3)DC_{im} \end{pmatrix}$$

and $$T^*DC_{im} = \begin{pmatrix} C(0)DC_{re}+D(0)DC_{im} \\ C(1)DC_{re}+D(1)DC_{im} \\ C(2)DC_{re}+D(2)DC_{im} \\ C(3)DC_{re}+D(3)DC_{im} \end{pmatrix}$$

where A, B, C and D can be precalculated constant multipliers dependent on the training sequence used.

The above described formulas are valid if there are four taps to be calculated in cross correlation and if the training sequence is at the beginning of the burst. In general form the formulas can be indicated as follows:

$$T^*DC_{re} = \begin{pmatrix} A(\text{rem}(i/4))DC_{re}+B(\text{rem}(i/4))DC_{im} \\ A(\text{rem}((i+1)/4))DC_{re}+B(\text{rem}((i+1)/4))DC_{im} \\ A(\text{rem}((i+2)/4))DC_{re}+B(\text{rem}((i+2)/4))DC_{im} \\ \ldots \\ A(\text{rem}((i+L)/4))DC_{re}+B(\text{rem}((i+L)/4))DC_{im} \end{pmatrix}$$

and $$T^*DC_{im} = \begin{pmatrix} C(\text{rem}(i/4))DC_{re}+D(\text{rem}(i/4))DC_{im} \\ C(\text{rem}((i+1)/4))DC_{re}+D(\text{rem}((i+1)/4))DC_{im} \\ C(\text{rem}((i+2)/4))DC_{re}+D(\text{rem}((i+2)/4))DC_{im} \\ \ldots \\ C(\text{rem}((i+L)/4))DC_{re}+D(\text{rem}((i+L)/4))DC_{im} \end{pmatrix}$$

where i=the start index of the training sequence in the burst, L=the number of lines in the matrix T, i.e. the number of cross correlation taps to be calculated. Rem ( ) is a remainder function that retrieves the remainder of the performed division. It should be noted that even in a general case only four pre-determined values are needed for each of the terms A, B, C and D.

Figure 4:
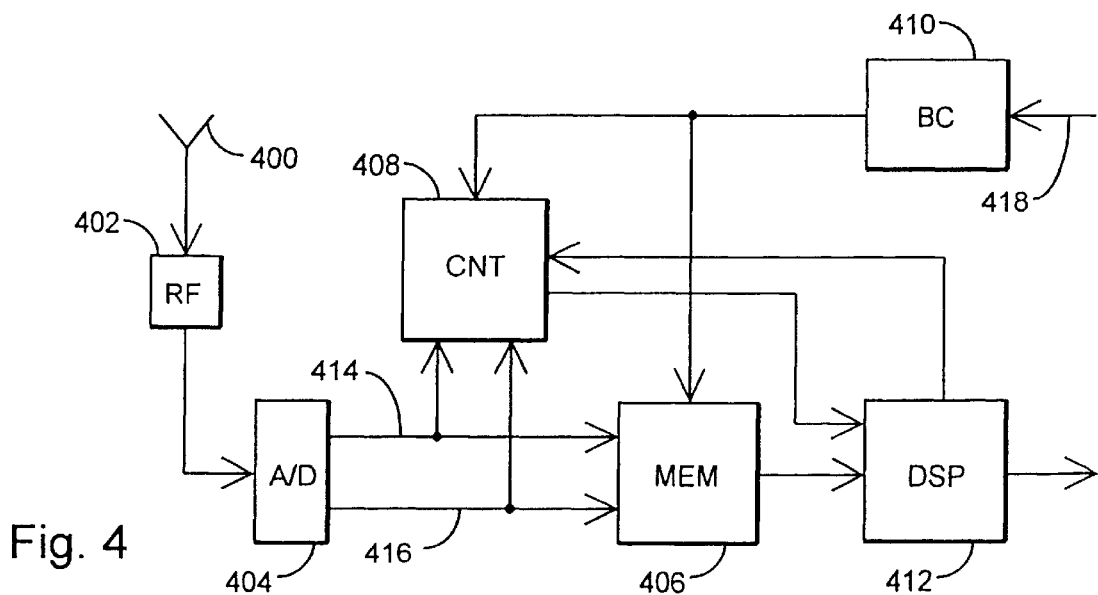
FIG. 4 illustrates an example of the receiver of the invention.

Let us next examine the receiver structure of the invention, illustrated with relevant parts in FIG. 4. The receiver comprises antenna 400 for conveying a received signal to radio frequency parts 402 in which the signal is converted into an intermediate frequency or to a baseband. The converted signal is conveyed to sampling means 404 where the signal is converted into digital form. The parts described above can be implemented using methods known to those skilled in the art.

The output of the sampling means comprise real and imaginary parts 414, 416 of the samples, taken from the signal and conveyed to memory means 406 and to calculation means 408. Calculation means 408 calculate the impulse response at the same time as samples are being received. The impulse response calculated by the calculation means still comprises a distortion caused by the DC offset. The output of burst counter 410 is led as an input to the calculation means. Information 418 about the beginning of the burst is the burst counter's control. The output of the calculation means is conveyed to signal processor 412, the original sampled signal from memory means 406 being led to it as the input. The signal processor removes the DC offset effect from the calculated impulse response applying the above described calculation measures. In the solution of the invention the calculation load of the signal processor is substantially smaller than in prior art solutions.

Figure 5:
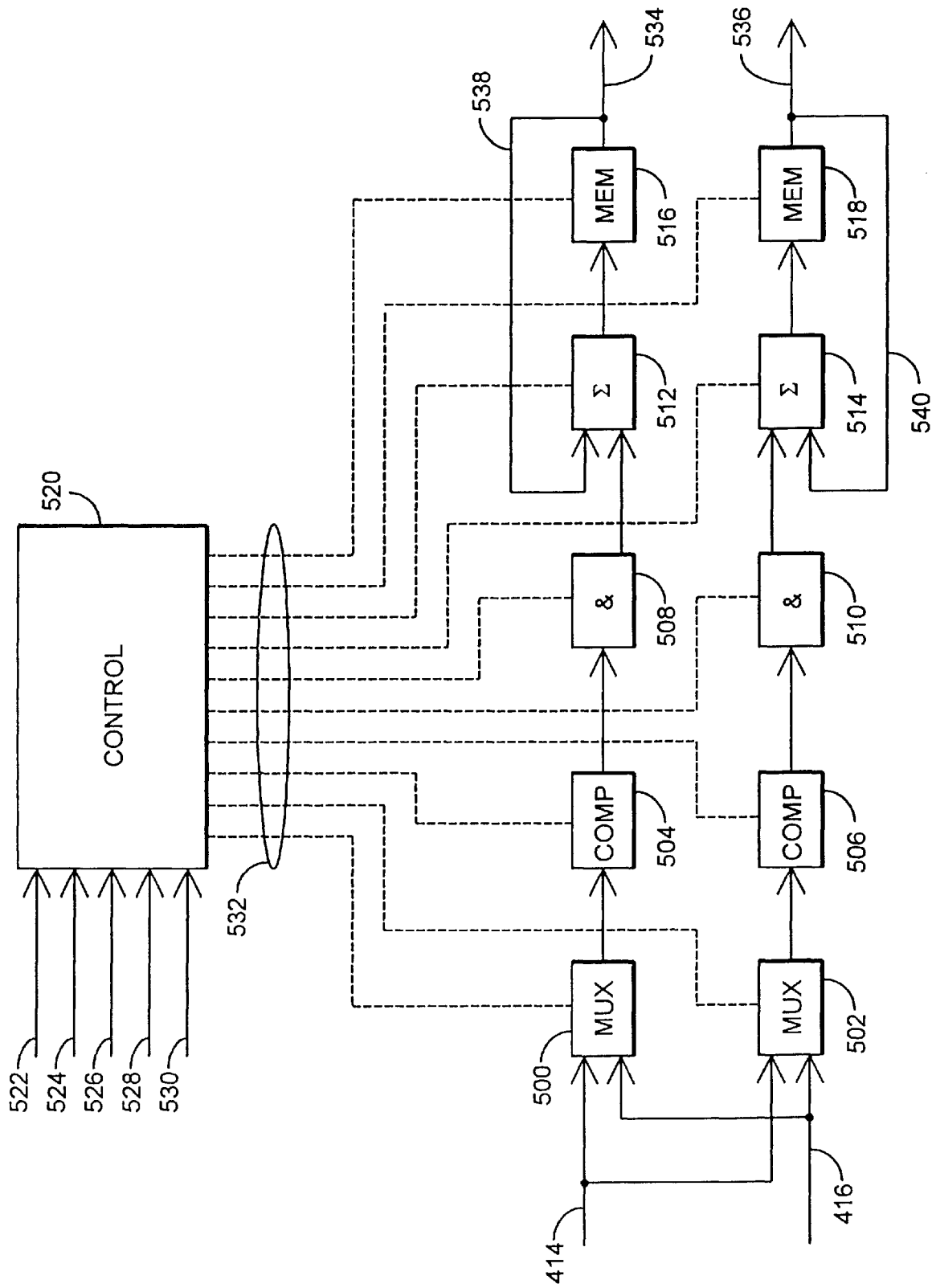
FIG. 5 illustrates in greater detail an example of the structure of the receiver of the invention.

Let us in the following examine an example of the calculation means structure illustrated with relevant parts in FIG. 5. In a counter the impulse response taps are counted by correlating samples with the training sequence and simultaneously the samples are demodulated. The sampled signal's real and imaginary parts 414, 416 conveyed to multiplexers 500, 502 are led as input to the counter. The multiplexed signals are further conveyed to calculation units 504, 506 where a complement of two is calculated, and further to masking means 508, 510 where an AND operation is performed. From the masking means the samples are conveyed to adders where feedback 538, 540 is added, and from the adder further to memory means 516, 518 in whose outputs real and imaginary impulse responses 534, 536 are calculated distorted by the DC offset. A control to which the length of training sequence 522, bit counter 524, the bits 526 of the training sequence, start and end indexes 528, 530 are led as the input, functions as control means 520 of the counter. Using control signals 532 the control controls the function of other parts.

The received signal is demodulated using multiplexers 500, 502 and calculation units 504, 506. Furthermore, control means 520 use complement blocks 504, 506 for performing a multiplication with the demodulation result and the training sequence bits currently corresponding to each cross correlation tap, i.e. for producing the necessary multiplication in cross correlation calculation. Each cross correlation tap to be counted corresponds to a different training sequence bit, whereby a number of transmitted signals equalling the number of cross correlation taps is needed for each bit arriving at a block in the output of complement blocks 504, 506. In memory means 516, 518 the result of each cross correlation is stored under its own memory address. Each cross correlation tap is counted simultaneously after the receipt of the bit. Using masking means 508, 510 the right moment for starting cross correlation can be chosen on the basis of the training sequence location.

Burst counter 410 starts counting bits at the beginning of each burst, and transmits the information to control 520.

Start index 528 is determined at that moment, when counting of the first tap of the impulse response is started, and end index 530 is determined at that moment when the last tap is counted. Training sequence 526 is needed for performing correlation. The training sequence and the length of training sequence 522 can be stored in programmable registers. The registers are not shown in the Figure.

Even though the invention has been explained above with reference to the example of the accompanying drawings, it is obvious that the invention is not restricted to it but can be modified in various ways within the scope of the inventive idea disclosed in the attached claims.

What is claimed is:

1. A method for estimating an impulse response in a digital radio system, in which signals to be received comprise bursts formed of symbols, the bursts comprising a known training sequence, the method comprising:

sampling from a received signal, measuring of a DC offset in the samples and correlating the signal with a known training sequence, wherein
calculating an impulse response by correlating the samples taken with the training sequence before the DC offset is removed, and
removing the DC offset effect from the calculated impulse response.

2. The method as claimed in claim 1, wherein the DC offset effect is removed by reducing from the calculated impulse response a correction term which is calculated by multiplying the measured DC offset values using the training sequence by precalculated multipliers.

3. The method as claimed in claim 1, wherein signal demodulation and impulse response measuring are performed in parallel.

4. A receiver in a digital radio system where a received signal comprises bursts formed of symbols, the bursts comprising a known training sequence, the receiver comprising:

means for sampling the received signal, and means for measuring a DC offset in the samples, wherein the receiver comprises
means for calculating an impulse response by correlating the samples taken with the training sequence before the DC offset is removed, and
means for removing the DC offset effect from the calculated impulse response.

5. The receiver as claimed in claim 4, wherein the receiver comprises means for calculating a correction term by multiplying the measured DC offset values using the training sequence by precalculated multipliers and means for subtracting the correction term from the calculated impulse response.

* * * * *